US008953923B2

(12) United States Patent
Li

(10) Patent No.: US 8,953,923 B2
(45) Date of Patent: Feb. 10, 2015

(54) TRAVERSE MODULE

(71) Applicant: ScienBizip Consulting (Shen Zhen) Co., Ltd, Shenzhen, Guangdong Province (CN)

(72) Inventor: Hong Li, Shenzhen (CN)

(73) Assignee: ScienBizip Consulting (Shen Zhen) Co., Ltd., Guangdong (CN)

( * ) Notice: Subject to any disclaimer, the term of this patent is extended or adjusted under 35 U.S.C. 154(b) by 209 days.

(21) Appl. No.: 13/629,704

(22) Filed: Sep. 28, 2012

(65) Prior Publication Data

US 2013/0251327 A1  Sep. 26, 2013

(30) Foreign Application Priority Data

Mar. 20, 2012 (CN) .......................... 2012 1 0074248

(51) Int. Cl.
*G02B 6/40* (2006.01)

(52) U.S. Cl.
USPC ......................................... 385/136; 385/147

(58) Field of Classification Search
USPC .......................... 385/134, 135, 137, 139, 147
See application file for complete search history.

(56) References Cited

U.S. PATENT DOCUMENTS

| 5,544,421 | A | * | 8/1996 | Thompson et al. | ................ 34/58 |
| 5,784,802 | A | * | 7/1998 | Thompson et al. | ............. 34/312 |
| 6,960,257 | B2 | * | 11/2005 | Thompson et al. | ............. 118/52 |

* cited by examiner

*Primary Examiner* — Akm Ullah
(74) *Attorney, Agent, or Firm* — Novak Druce Connolly Bove + Quigg LLP

(57) ABSTRACT

A traverse module includes a frame, a guiding shaft, an optical module, a cover, and a conductive member. The guiding shaft is mounted to the frame. The optical module is slidably mounted to the guiding shaft, and the optical module is capable of generating high frequency electrical signals which cause electro magnetic interference. The high frequency electrical signals are capable of flowing to the guiding shaft. The cover is grounded, the cover covers the frame. The conductive member projects from the cover and tightly clamps the guiding shaft, and the high frequency electrical signals generated by the optical module can flow to ground by using the conductive member.

10 Claims, 4 Drawing Sheets

TRAVERSE MODULE

BACKGROUND

1. Technical Field

The present disclosure relates to disc drives, particular to a traverse module.

2. Description of Related Art

A traverse module is a major component of a disc drive. The traverse module includes a frame, a cover, an optical module, a spindle motor, and a guiding shaft. The frame and cover both define openings. The spindle motor and the guiding shaft are mounted to the frame. The optical module slides along the guiding shaft. The cover covers the frame and enables the spindle motor and the optical module to protrude out of it via the openings. Because the optical module is capable of generating high frequency electrical signals, electro-magnetic interference (EMI) is issued. The method to enable the traverse module to be protected from EMI is by placing a conductive sponge between the cover and the guiding shaft. However, the conductive sponge cannot fully contact the guiding shaft and the cover, as a result, the traverse module cannot be fully protected from EMI.

Therefore, there is room for improvement within the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

Figure 1:
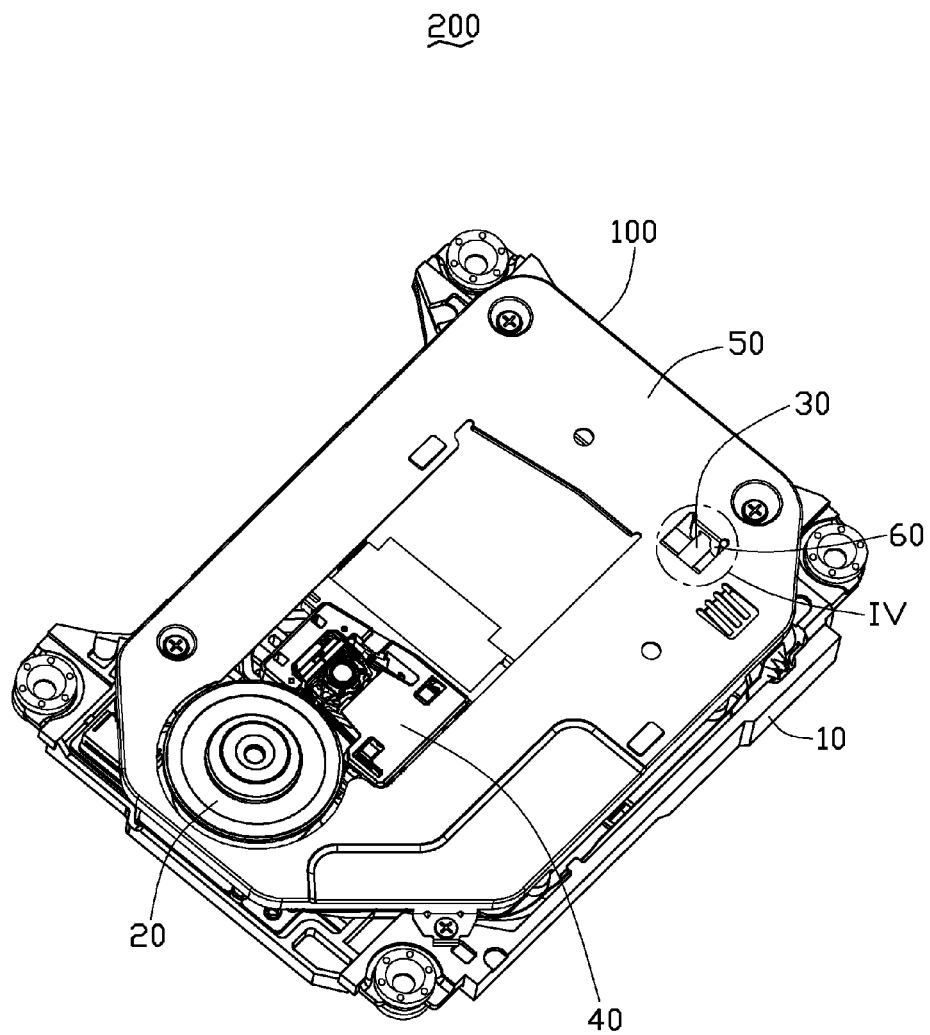
FIG. 1 is an isometric view of a traverse module.
Figure 2:
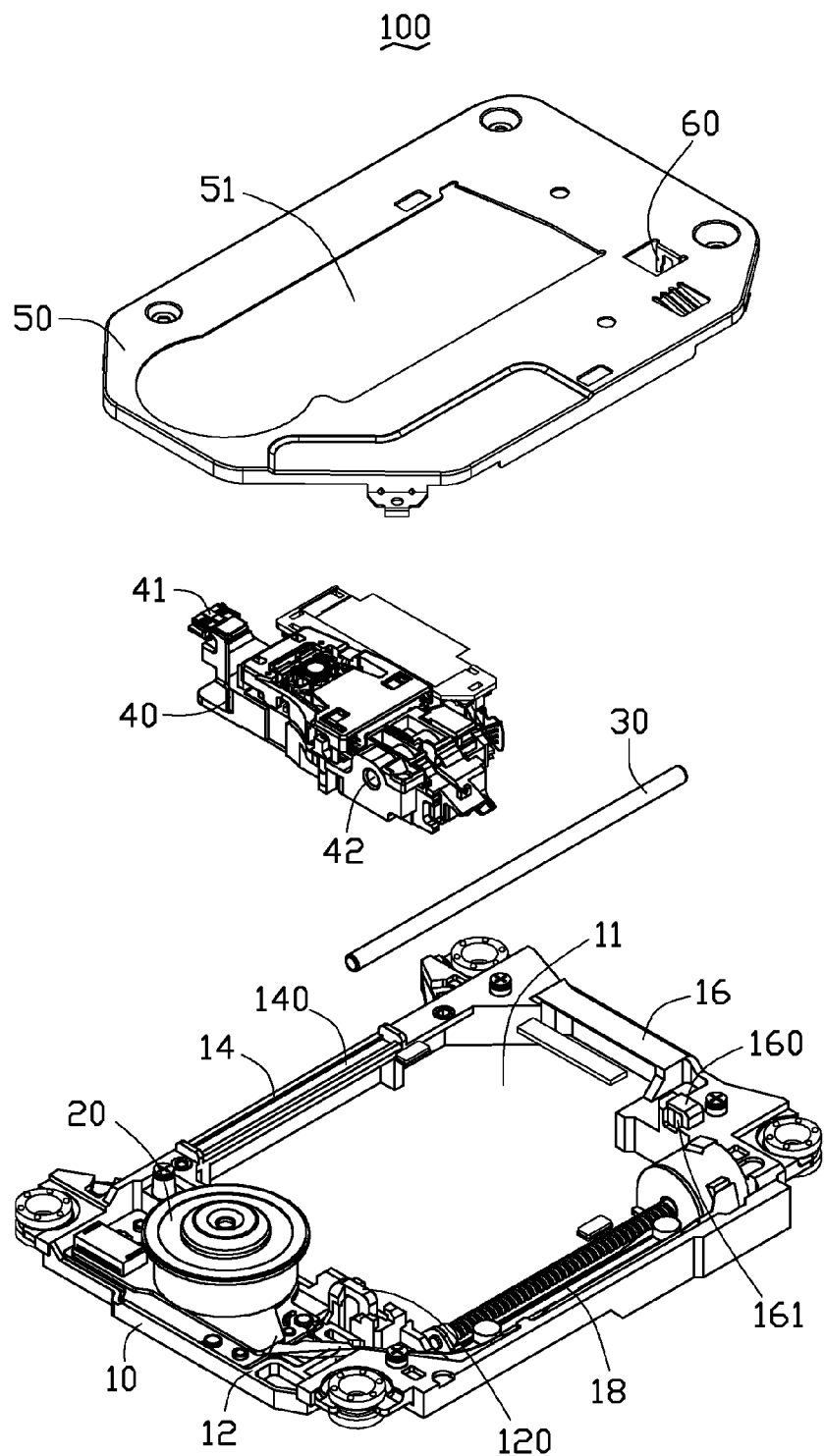
FIG. 2 is an explored view of the traverse of FIG. 1.
Figure 3:
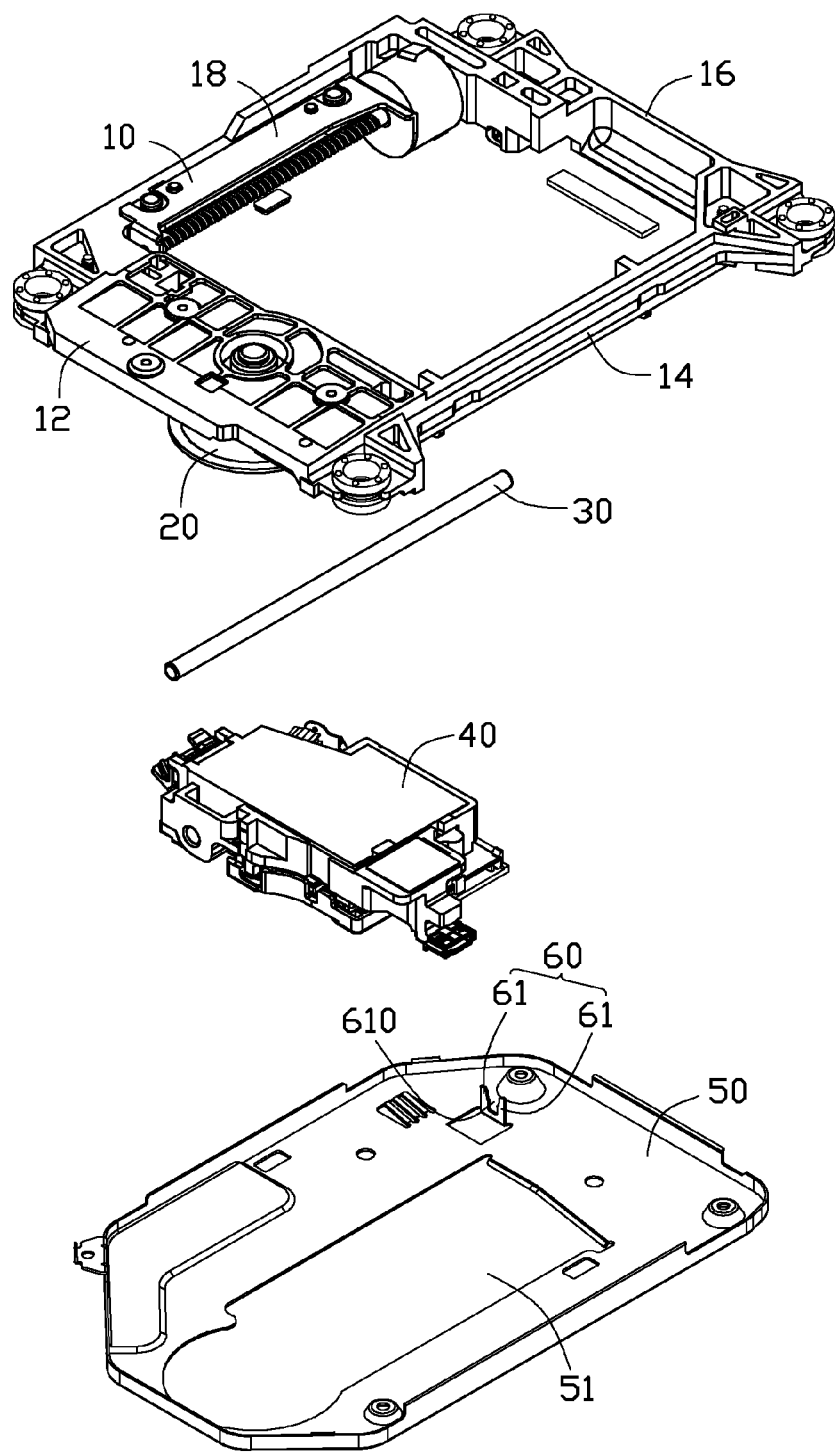
FIG. 3 is an inverted view of the traverse module in FIG. 2.

Referring to FIGS. 1-3, disc drive 200 of one embodiment is shown. The disc driver 200 is capable of reading data from or writing data to a disc. The disc drive 200 includes a traverse module 100. The traverse module 100 includes a frame 10, a spindle motor 20, a guiding shaft 30, an optical module 40, a cover 50, and a conductive member 60. The spindle motor 20, the guiding shaft 30 and the optical module 40 are mounted to the frame 10. The optical module 40 is capable of sliding along the guiding shaft 30, and generates high frequency electrical signals which cause electro-magnetic interference. The cover 50 is grounded and covers the frame 10. The conductive member 60 projects from the cover 50 and clamps the guiding shaft 30. The high frequency electrical signals flow to the ground via the guiding shaft 30 and the conductive member 60.

The frame 10 defines a first opening 11. The frame 10 includes a first side 12, a second side 14, a third side 16, and a fourth side 18 connected end to end, and surrounding the first opening 11. The first side 12 faces the third side 16. The second side 14 faces the fourth side 18. A rail 140 is arranged on the second side 10. A stepper (not labeled) is arranged on the fourth side 18. A fixing part 120 and a securing seat 160 are respectively arranged on the first side 12 and the third side 16. The fixing part 120 faces the securing seat 160, and both are adjacent to the fourth side 18. The securing seat 160 defines a fixing hole 161.

A sliding member 41 projects from one side of the optical module 40. The sliding member 41 is integrated with the optical module 40, and is slidably received in the rail 140. As a result, the one side of the optical module 40 is supported by frame 10. A through hole 42 is defined in the other side of the optical module 40, and the through hole 42 has an axis parallel to the rail 140.

The guiding shaft 30 passes through the through hole 42 and contact to the optical module 40, as a result, the high frequency electrical signals generated by the optical module 40 are passed to the guiding shaft 30, and the optical module 40 slides along the guiding shaft 30. One end of the guiding shaft 30 is fixed in the fixing part 120. The other end of the guiding shaft 30 is received in the fixing hole 161 to be secured in the securing seat 160. As a result, the guiding shaft 30 is secured to the frame 10 and is parallel to the rail 140. Therefore, the optical module 40 straddles the rail 140 and the guiding shaft 30, and moves along the rail 140 and the guiding shaft 30.

Figure 4:
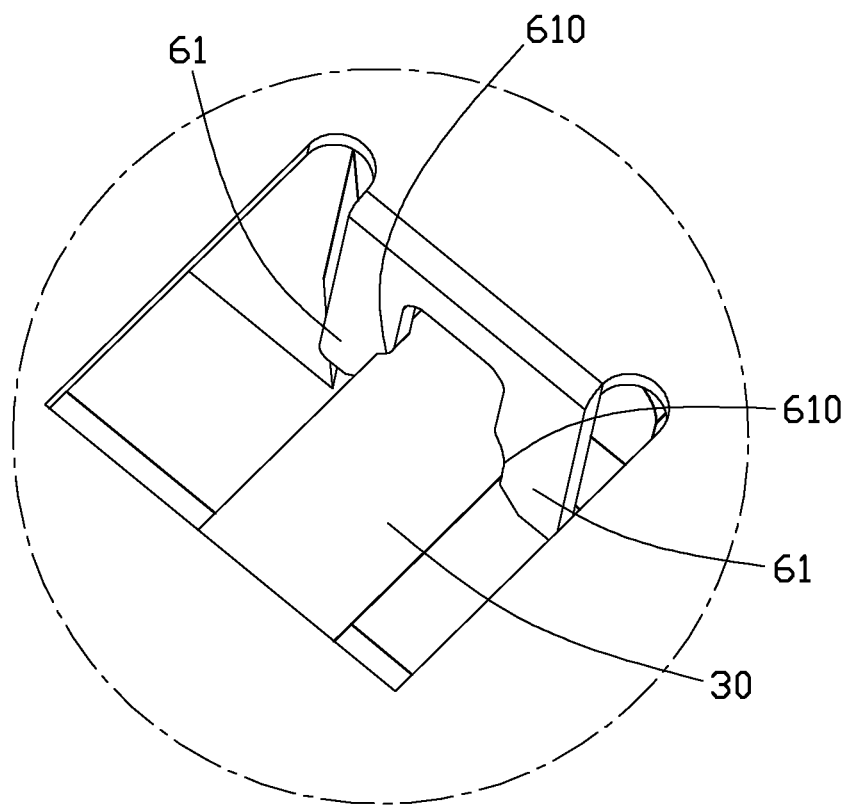
FIG. 4 is an enlarged view of a circle of IV in FIG. 1.

Referring to FIG. 4, the cover 50 defines a second opening 51. The optical module 51 is passed through the opening 51. The conductive member 60 is projected from the cover 50 facing the frame 10. The conductive member 60 includes two separate clamping elements 61. The clamping elements 61 include two arc sidewalls 610 facing each other. The two sidewalls 610 match the guiding shaft 30 and a distance between the two side walls 610 is smaller than a diameter of the guiding shaft 30, as a result, the two clamping parts 61 tightly clamps the guiding shaft 30. Therefore, the high frequency electrical signals generated by the optical module 40 are conducted by the guiding shaft and the cover 50 to be grounded.

In the embodiment, the conductive member 60 is made out of the cover 50. How to make the conductive member 60 is described below.

First, a rectangular part is defined in the cover 50. Second, the cover 50 is cut along three edges of the rectangular part. Third, the rectangular part is curved from the remain edge toward to the frame 10. Fourth, a through hole is defined in the rectangular part, at this time, the conductive member 60 is formed.

As described above, the high frequency electrical signals are capable of flowing to the ground by using the conductive member 60 to clamp the guiding shaft 30. In addition, the conductive member 60 is capable of tightly clamping the guiding shaft 30. As a result, the disc drive 100 is well protected from EMI.

Even though relevant information and the advantages of the present embodiments have been set forth in the foregoing description, together with details of the functions of the present embodiments, the disclosure is illustrative only; and changes may be made in detail, especially in the matters of shape, size, and arrangement of parts within the principles of the present embodiments to the full extent indicated by the broad general meaning of the terms in which the appended claims are expressed.

What is claimed is:
1. A traverse module, comprising:
a frame;
a guiding shaft mounted to the frame;
an optical module slidably mounted to the guiding shaft, and the optical module capable of generating high frequency electrical signals which cause electro magnetic interference, the high frequency electrical signals being conducted by the guiding shaft;
a cover being grounded, the cover covering the frame; and a conductive member projecting from the cover and tightly clamping the guiding shaft, and the high frequency electrical signals generated by the optical module can flow to the ground by using the conductive member.

2. The traverse module of claim 1, wherein the conductive member comprises two separate clamping elements, the guiding shaft is clamped between the two clamping elements.

3. The traverse module of claim 1, wherein the clamping elements comprise two sidewalls facing each other, the sidewalls match the guiding shaft.

4. The traverse module of claim 3, wherein a distance between the sidewalls is smaller than a diameter of the guiding shaft.

5. The traverse module of claim 1, wherein the conductive member is integrated with the cover.

6. A traverse module, comprising:
a frame;
a guiding shaft mounted to the frame;
an optical module slidably mounted to the guiding shaft, and the optical module capable of generating high frequency electrical signals which cause EMI, the high frequency electrical signals being conducted by the guiding shaft; and
a conductive member being grounded, and the conductive member clamping the guiding shaft as to conductive the high frequency electrical signals generated by the optical module to ground.

7. The traverse module of claim 6, wherein the conductive member comprises two separate clamping elements, the guiding shaft is clamped between the two clamping elements.

8. The traverse module of claim 7, wherein the two clamping elements comprise two sidewalls facing each other, the sidewalls match the guiding shaft.

9. The traverse module of claim 8, wherein a distance between the sidewalls is smaller than a diameter of the guiding shaft.

10. The traverse module of claim 7, further comprising a cover which is grounded, the conductive member being integrated with the cover.

\* \* \* \* \*